US006594885B2

(12) United States Patent
Abdel-Tawab et al.

(10) Patent No.: US 6,594,885 B2
(45) Date of Patent: Jul. 22, 2003

(54) METHOD OF MAKING A COIL

(75) Inventors: Khaled I. Abdel-Tawab, Simpsonville, SC (US); Gordon A. Grigor, Cleveland Heights, OH (US); Clarence J. Harsa, Broadview Heights, OH (US); Laszlo S. Ilyes, Richmond Heights, OH (US); James D. Mieskoski, Seven Hills, OH (US); Louis R. Nerone, Brecksville, OH (US); James K. Skully, Willoughby, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/749,483

(22) Filed: Dec. 26, 2000

(65) Prior Publication Data

US 2002/0079999 A1 Jun. 27, 2002

(51) Int. Cl.$^{7}$ .......................... H01F 7/128; B29C 53/82

(52) U.S. Cl. .......................... 29/606; 29/602.1; 29/453; 336/83; 336/205; 336/207; 336/208; 264/272.19; 264/236; 264/347

(58) Field of Search ................................ 29/602.1, 606, 29/605, 453; 336/83, 205, 206, 207, 208; 264/272.19, 272.2, 236, 347

(56) References Cited

U.S. PATENT DOCUMENTS 3,638,155 A * 1/1972 Combs ........................ 336/205
4,978,712 A * 12/1990 Bair et al. .................. 264/236
5,600,294 A * 2/1997 Buenconsejo et al. ...... 336/208

FOREIGN PATENT DOCUMENTS

JP 2-223204 * 3/1990 .................. 29/605

* cited by examiner

*Primary Examiner*—Peter Vo
*Assistant Examiner*—A. Dexter Tugbang
(74) *Attorney, Agent, or Firm*—Fay, Sharpe, Fagan, Minnich & McKee, LLP

(57) ABSTRACT

A method of assembling a coil includes forming a ferrite core having a top end, a bottom end, an inner opening extending from the top end to the bottom end, a cylindrical outer surface, and a step portion formed near the bottom end, the step portion extending past the outer surface. A first high dielectric material is applied on the outer surface of the ferrite core, then a conductive wire is wound onto the high dielectric material, whereafter a second high dielectric material is applied over the conductive wire.

18 Claims, 4 Drawing Sheets

METHOD OF MAKING A COIL

BACKGROUND OF THE INVENTION

An electrodeless fluorescent lamp (EFL) implements a coil design in its configuration. Such a coil design includes a cylindrical ferrite core, a bobbin and conductive insulative wire wound around a portion of the bobbin. FIG. 1 illustrates a prior art high-temperature plastic threaded bobbin 10 which may be used in such a design. As depicted, bobbin 10 includes a high-temperature plastic base portion 12 and an integrated threaded high-temperature plastic chimney portion 14. Chimney portion 14 is molded to include grooves 16 on the exterior cylindrical surface. A cylindrical ferrite core, not shown, is placed within the interior 18 of chimney 14 and conductive wire (not shown) is wound around chimney 14 by following the groove pattern 16. A tape or shrink-tubing product would then be placed around the wound conductive wire to maintain the wire in position and maintain the integrity of the coil.

In the prior art coil, there are at least two ends of the conductive wire wound around the chimney 14 of bobbin 10. The ends of these wires are passed through the base 12 for attachment to an electronic board or alternatively attached to plugs attached to the underside of base 12. The plugs may be received by the electronic board for connection of the coil configuration. Threads 16 provide a built-in pitch wire spacing for the conductive wire.

Chimney 14 is a split element 20 whereby when conductive wire is wound around chimney 14 in the groove pattern 16, chimney 14 is compressed around the ferrite core. Hook or holding elements 22 act to maintain the core securely within interior 18. The underside of base 12 is formed such that the bottom portion of ferrite core is held within the chimney 14. Bobbin 10 acts as an electrically insulating layer between the conductive wire and the ferrite core sufficient to prevent electrical breakdowns from occurring within the coil. The conductive wire itself may be insulated, and capable of continually withstanding temperatures approximately 250° C.

During operation of a coil, the highest temperature in the core body will occur in the middle height location of the core. Therefore, in FIG. 1 the area having the highest temperature on bobbin 10 would be approximately at location 24. For an RF coil assembly intended to work with EFL products in the 120-volt and 230-volt range, the temperature at this center point 24 could reach 250°. This being the case, it is necessary for bobbin 10 to be made of a material that has a maximum allowable service temperature capable of withstanding such a temperature level. Temperatures at the ends of the coil are around 200° C.

A drawback of a coil manufactured using bobbin 10 of FIG. 1, is the requirement of using the high-temperature material in order to withstand the temperatures generated during operation of the coil. This necessitates the use of expensive high temperature materials. Further, bobbin 10 uses a significant amount of such an expensive material due to the chimney feature. Additionally there is a significant amount of cost involved in manufacturing the bobbin 10 with threads 16.

Therefore, the present invention looks to manufacture a simplified RF coil assembly with decreased costs as compared to existing coil assemblies, where the coil assembly meets expectations and operational requirements for use with an electrodeless fluorescent lamps.

BRIEF SUMMARY OF THE INVENTION

A cylindrical ferrite core includes a top-end, bottom-end and inner opening extending from the top end to the bottom end. An outer surface of the cylindrical core includes a step portion formed at the bottom end of the core, extending past the outer circumference of the non-step portion. A first high dielectric material is formed over at least a substantial portion of the outer surface of the cylindrical core to provide an insulative barrier. A length of conductive wire having a first end and a second end is wound around the first high dielectric material located over the outer surface of the cylindrical ferrite core. A second high dielectric material is then placed or located over the length of the conductive wire. This configuration seals the conductive wire between the two high dielectric materials and insulating the conductive wire from the ferrite core. A coil holder is provided having a base portion with a base opening formed substantially in a centered area in the base of the coil holder, the base opening is sufficiently sized to provide a passage way to the inner opening of the ferrite core. A snap-fit portion having a plurality of snap-fit fingers extending from the base portion engage the step portion of the cylindrical ferrite core, whereby the core is locked into engagement with the coil holder.

DETAILED DESCRIPTION OF THE INVENTION

Figure 1:
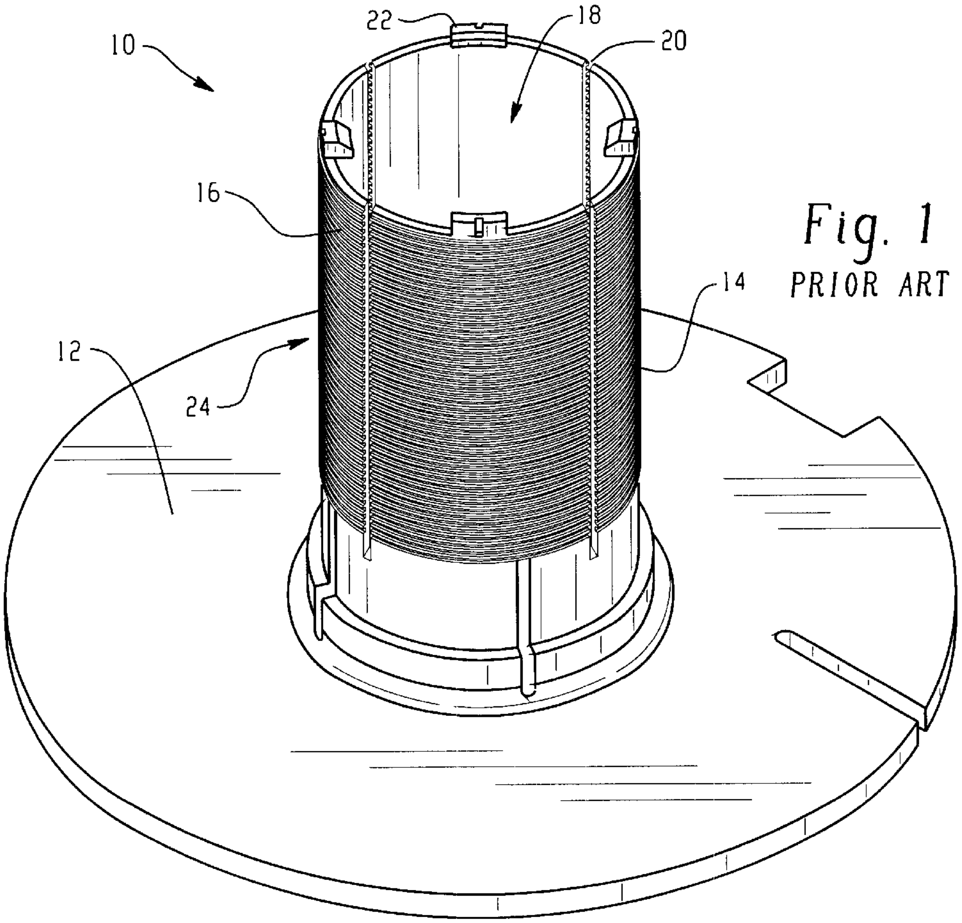
Fig. 1 PRIOR ART
FIG. 1 depicts a prior art high-temperature plastic threaded bobbin.
Figure 2:
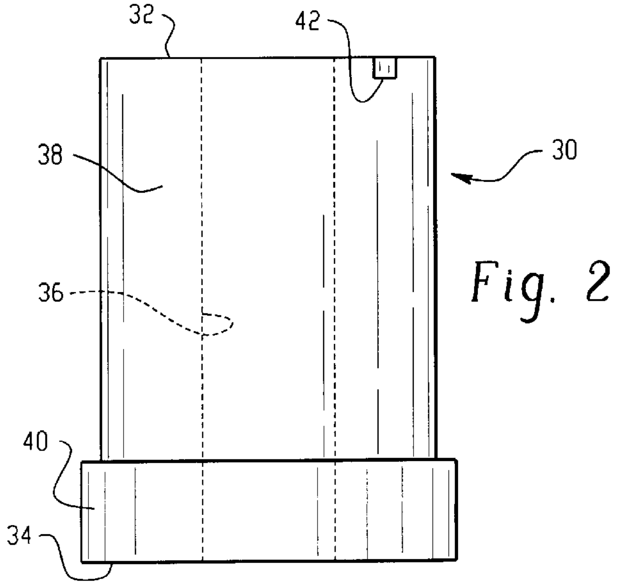
FIG. 2 shows a cylindrical ferrite core having a step portion.

Turning to FIG. 2, illustrated is a first embodiment of a ferrite core or tube 30 designed in accordance with the teachings of the present invention. Core 30 includes a top end 32, a bottom end 34, an inner opening 36 extending from the top end 32 to the bottom end 34. An outer surface 38 of a cylindrical formation with a step portion 40 extending past the outer surface 38. In the present embodiment, step 40 extends in a cylindrical manner approximately 1 mm around the circumference past outer surface 38 of ferrite core 30. It is understood that step 40 may be vary from the mentioned 1 mm. A notch 42 may be optionally provided in core 30 to assist in holding a coil winding in place. This concept will be discussed in greater detail below.

The core 30 of FIG. 2 is manufactured by use of a form. Alternatively, the core could be machined by taking a larger dimension core and machining it down to a desired formation. If the core is machined, it is preferred to provide an annealing of the cores to maintain a quality factor (Q) desirable for operation of an EFL component. Another manner of forming the core is by an extrusion process.

Ferrite core 30 which may be used in a preferred embodiment of the present invention, has the following parameters. The core geometry and material must provide a given inductance value without causing the need for geometric changes in the EFL device in which it is used. Parameters for a core intended to be used with an EFL device previously described, has an outside diameter (OD) of 17±0.35 mm; an inside diameter (ID) of 8.6±0.25 mm; and a length of 30±0.7 mm.

Figure 3:
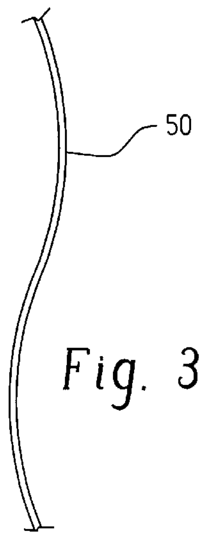
FIG. 3 illustrates a conductive wire used in the present invention.

In the present invention, a conductive wire 50 such as in FIG. 3, is to be wound around the ferrite core 30 (of FIG. 2). Wire 50, in one embodiment, is a bare copper magnetic wire. Winding wire 50 onto core 30 is conceptually different from prior art coils which incorporate a bobbin feature configuration to carry the wound wire. It is to be appreciated that winding the conductive wire directly onto the ferrite core 30 could result in conduction between windings of the wire through the ferrite core 30. Particularly, there is a concern that even if an insulated wire is wound around the ferrite core, during the life of the coil assembly, the wire would break down causing conduction between the wire and core, causing a malfunction of the coil. This possibility emphasizes the need to provide some sort of insulating material between the ferrite core 30 and the conductive wire 50.

Figure 4:
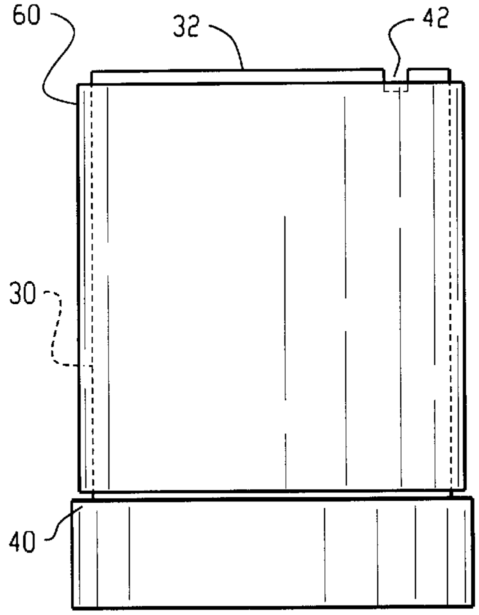
FIG. 4 illustrates a first high-dielectric material formed over the ferrite core of FIG. 2.

FIG. 4 depicts a first high dielectric material 60 applied to ferrite core 30. As can be seen, the step portion 40 and a small portion of the upper end 32 of core 30 are not encompassed within first dielectric 60. It is to be appreciated that the windings of wire 50 will not be wound as far down core 30 to include step 40 or go to upper end 32. Therefore the first dielectric material 60 does not need to cover these portions of the core 30. However, in another embodiment, it is of course possible to include the dielectric material to cover core step 40 or upper end 32.

In selecting the appropriate coating material for a first high dielectric material 60, it is desirable to select a material which will maintain thermal stability at a continuous temperature substantially equal to or greater than 250° C., and will have a temperature expansion co-efficient which matches ferrite core 30 or otherwise be malleable. It is to be appreciated that some applications may be able to operate at lower temperatures, such as systems designed for table lamps instead of ceiling fixtures, and low wattage systems. Such material should also not adversely affect the ferrite material electromagnetic performance (i.e. dielectric strength, resistivity, magnetic flux density, permeability, and Q). Material 60 should also provide sufficient insulation between the coil formed by wire 50, and core 30, and between adjacent turns of wire 50. The coating for the high dielectric material used in the present embodiment is also beneficially of a low cost, easy to apply and provides the appropriate material strength and adhesion to maintain the coil active for a life span of approximately 15,000 hours or more. Coatings which may be used include at least silicon/rubber/polymer coatings, ceramic coatings and vitreous/glass coatings. Specific types of coatings which meet the foregoing requirements include but are not limited to a material TSE 326, a silicon product from General Electric, PTFE and PFA which are Teflon products from Dupont, and Xydar G-930, a liquid-crystal polymer (LCP).

The first high dielectric material 60 is used to not only provide an insulative layer between the core and conductive wire, but also to provide space insulation.

It should be emphasized here that the required thickness will play a part in determining the method of coating ferrite core 30. For example, spray coating techniques are able to apply up to 1 mil/per application. To build up a large thickness with spray coating, the process will need to be applied repeatedly. Dip-coating can build a thickness of up to approximately 50 mils per application. In this technique, the core is placed on a rod or other holder, is dipped into a coating material. Once removed from the material, core 30 now covered in the high dielectric coating, is spun to evenly distribute the coating on the core. Another technique includes brushing on the coating material. Therefore, when choosing the method of application, it may be useful, though not necessary, to have electromagnetic calculations made to establish the required insulation thickness for the first high dielectric layer 60. The manner of obtaining such calculations are known in the art by one of ordinary skill.

With attention to ceramic coatings, ceramics can withstand very high temperatures and they provide a room temperature, short-time curability and high manufacturability if needed for winding. By controlling the chemistry and density (porosity) the dielectric properties can be optimized (low permitivity and losses) to match that of polymers. To promote adhesion, the reactivity between the ceramic coating and the ferrite core is optimized. Selected ceramics should not degrade the electromagnetic characteristics of the core. The material should be stable for the life of the lamp (i.e. greater than 15,000 hours) at the operating temperatures. The coefficient of thermal expansion of the coating in the core should be matched so that there is no cracking and spallation of the coating during the curing and the subsequent use cycles. The high dielectric strength and resistivity are required of the material to provide insulation between the coil wire and the core. Some ceramic adhesives and coating systems include but are not limited to Brewer $AlPO_4$ from General Electric, P-78 and No. 31 from Sauereisen and Ceramadip 538N from Aremco.

Figure 5:
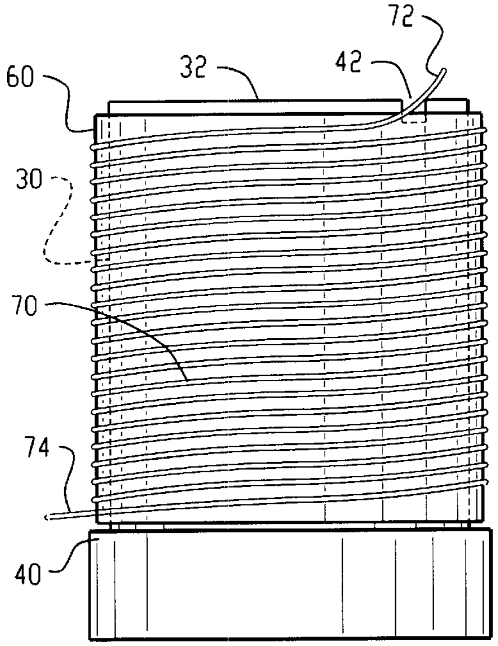
FIG. 5 depicts the conductive wire wound around the insulative material of FIG. 4.

Turning to FIG. 5, core 30 is shown with a first covering of a high dielectric material 60 around which is wound wire 50 in the form of a coil 70.

One embodiment of the present invention, the first high dielectric material 60, is cured only to a point where it is still of a substantially tacky consistency. Conductive wire 50 which may be a bare copper wire is wound onto the partially cured high dielectric layer 60 using a known winding process. The tackiness of the partially cured layer 60 assists in maintaining the wire position on the ferrite core 30 as the coil is wound. Such a winding procedure will provide the required winding pitch, and also help hold the wire in place. However, if it is found the winding of conductive wire 50 in this process is too time-consuming, an alternative process is to fully cure the first high dielectric material 60 prior to the winding process.

Winding of conductive wire 50 on first high dielectric material 60 in a coil formation 70, as shown in FIG. 5, results in a first end portion 72 and a second end portion 74. These end portions will, eventually, be connected to an electronic circuit such as in an EFL assembly. To secure the winding, one of the first end and the second may be inserted into notch 42, of core 30. The winding of conductive wire 50 as coil 70 may be accomplished by one of many known winding techniques.

It is noted that in one embodiment, conductive wire 50 used to form coil 70, may be a rectangular wire. Such an embodiment is considered to provide the benefit of maintaining desired wire spacing. Further, a benefit of rectangular wire over square wire is that square wire generally has thinner insulation at its corners and thus a lower voltage breakdown capability.

Figure 6:
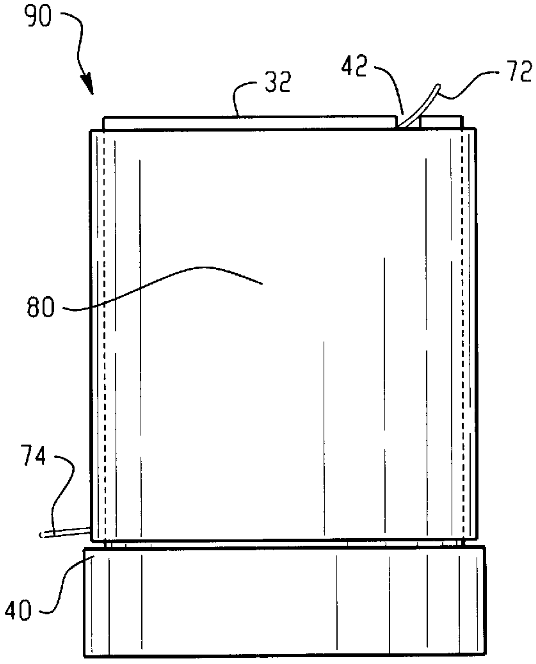
FIG. 6 shows the second insulative material formed over the conductive wiring.

Once the coil 70 has been formed over material 60 and around core 30, a second high dielectric material 80 is applied over wire coil 70 as depicted in FIG. 6. The coil ends 72 and 74 are not encompassed within this second high dielectric material 80. The second layer of high dielectric material assists in holding the wire coil 70 (FIG. 5) in place, and seals it from the environment to retard oxidation of the wire in the high-temperature environment.

The entire coil assembly 90 of FIG. 6, includes core 30, first high dielectric material 60, coil wire winding 70, and the second high dielectric material 80. This assembly is cured so dielectric coatings 60 and 80 form into a solid material. This solid maintains coil 70 in its precisely wound shape, forming the hermetic seal to prevent the oxidation of the wire, and electrically insulate it from the surface of ferrite core 30 to prevent electrical breakdown of the coil.

Figure 7:
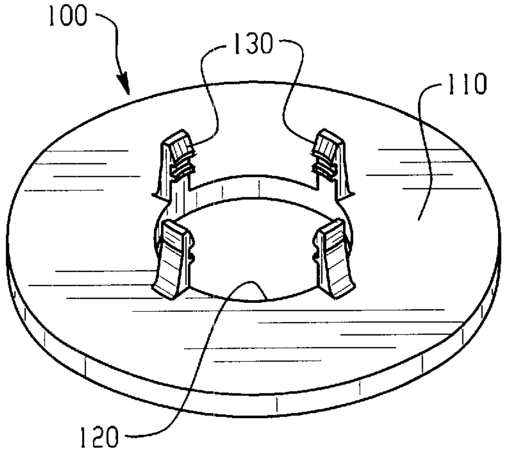
FIG. 7 sets forth a coil holder of the present invention.
Figure 8:
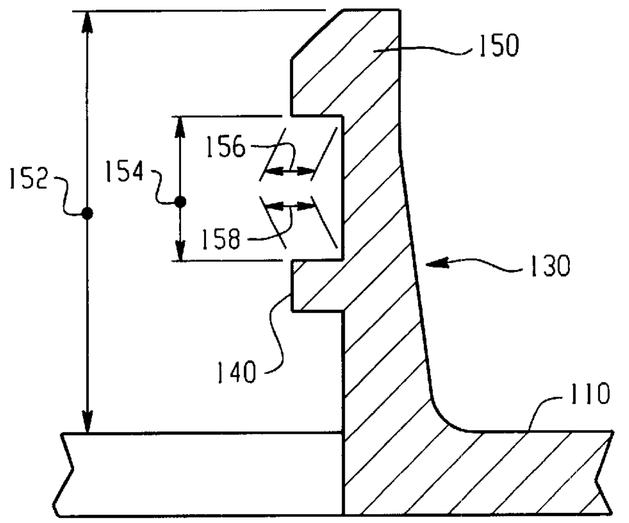
FIG. 8 shows a side view of a snap-fit finger of the coil holder.

Turning now to FIG. 7, shown is a coil holder 100 according to concepts of the present invention. Coil holder 100 includes a base portion 110 having a base opening 120 formed substantially at a centered area of the coil holder 100. The base opening 120 is sufficiently sized to provide a passageway to the inner opening of the ferrite core 30 once attached to holder 100. Also included is a snap-fit portion comprising a plurality of snap-fit fingers 130, which extend from the base portion 110. In one embodiment the snap-fit portion consists of four evenly spaced snap-fit fingers 130. However, more or less fingers may also be used. Snap-fit fingers 130 are designed to receive step 40 of core 30. This concept is depicted in more detail in FIG. 8 which provides a side view of one of snap-fit fingers 130 for engaging step 40 of ferrite core 30. As can be seen from this figure, step 40 fits into snap-fit finger 130, which has a bottom ledge portion 140 and an upper support or top tab 150. To allow for more flexibility, snap-fingers 130 are designed such that the top tabs 150 are tapered in a vertical direction.

In one preferred embodiment of the present invention, the overall core height is 30 mm, where the step is 3 mm. The step outer diameter is 19.02 mm, and the core body outside diameter is 17.02 and the inner opening is 8.56 mm in diameter. Each of the dimensions have a ±2% tolerance. The snap-fit finger connection's preferred dimensions for the present embodiment include an inner groove diameter of 19.50 mm±0.1% (i.e. a diameter corresponding to the four snap fingers), an overall individual snap finger height of 9.3 mm±0.5% (152), a snap finger inner opening height dimension of 3.2 mm±0.05% (154), an upper depth of 0.8 mm±0.05% (156), and a lower depth of 1.0 mm±0.05% (158).

Figure 9:
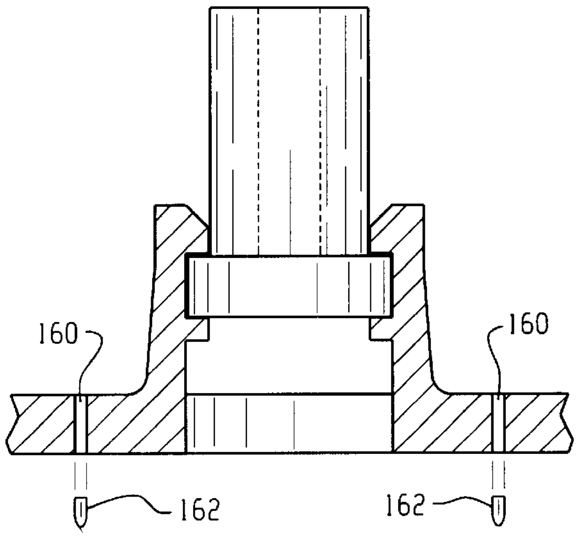
FIG. 9 illustrates a snap-fit engagement between the ferrite core and coil holder.

Coil holder 100 is secured to the coil assembly 90 as shown in FIG. 9. Since coil holder 100 is far simpler in design than a prior art bobbin, and since it does not need to endure temperatures nearly as high as the prior bobbin designs, it may be manufactured at a much lower cost.

Through-holes such as 160 are provided as passageways for first end 72 and/or second end 74 to pass through the bottom side of base 110. It is to be understood that in the wiring process, first end wire 72 may pass through the inner portion 36 of core 30 and therefore not be required to use a through-hole but rather will pass through the back side of base 110 via center portion 120. The back side of base 110, can have pins 162, attached to which are connected the first and second ends 72 and 74. Connection between pins 160 and ends 72,74 can be made by a clamp connection, soldering or other known connection technique. Pins 136, are then capable of being inserted into female receptacles of a larger electronic component.

Figure 10:
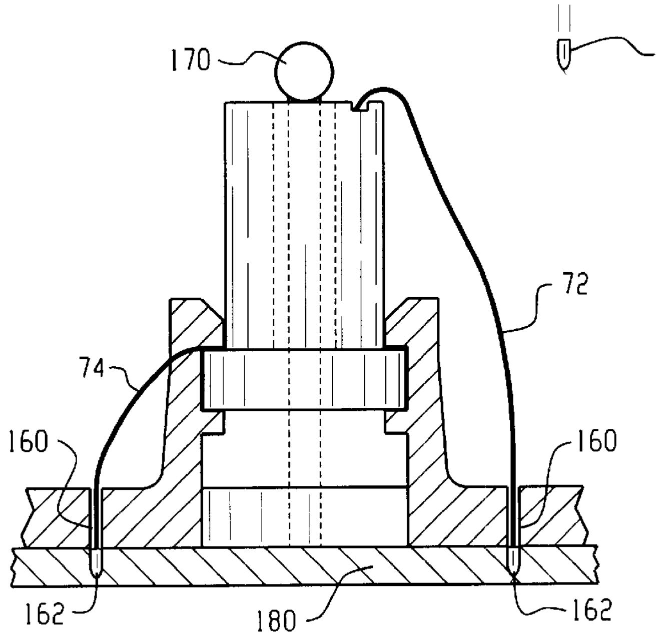
FIG. 10 depicts an EFL device designed using the coil of the present invention.

Turning to FIG. 10, depicted is an EFL configuration. A lighting element 170 is shown inserted into the inner opening 36 of core 30 of coil assembly 90. Pins 160 connected to at least ends 72,74 are inserted into a power source 180 causing the lamp to function as an electrodeless fluorescent lamp.

Figure 11:
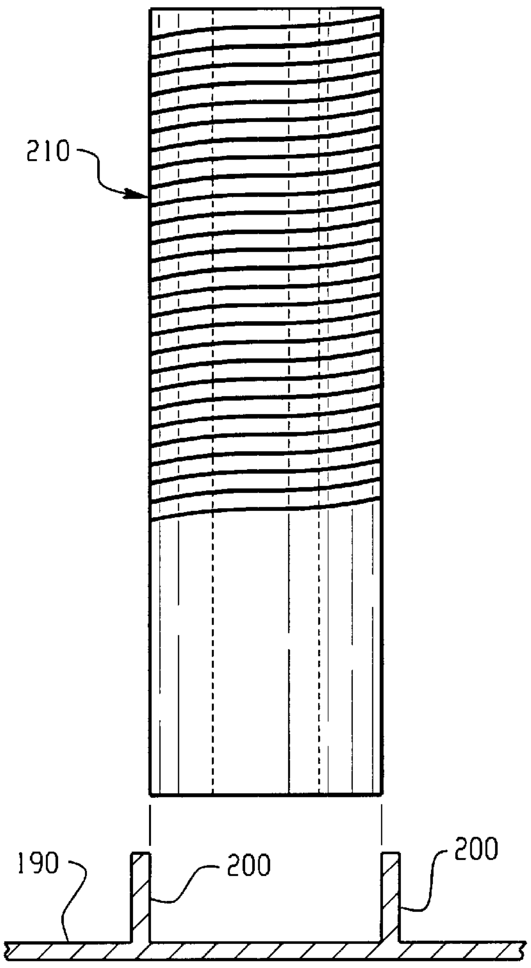
FIGS. 11, 12 and 13 show alternative connection concepts of the present invention.
Figure 12:
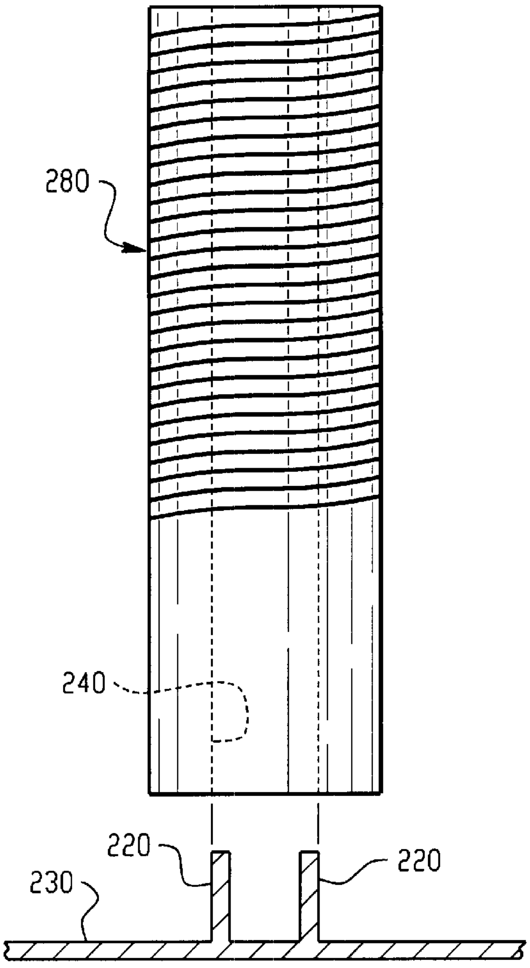

It is to be appreciated that in addition to the snap-fit technology described, the present invention may also include the use of a coil holder using a press-fit assembly. The press-fit assembly such as shown in FIGS. 11 and 12 include both an outside press fit and an inside press fit. Particularly, core holder 190 of FIG. 11 includes prongs 200 spaced such that they are slightly outside the outer dimension of core 210. As illustrated, core 210 is similar to core 30, but is symmetrical throughout its length. As core 210 is pressed to holder 190, pressure from impingement of core 210 with pins 200, hold core 210 in place. Turning attention to FIG. 12, inside press-fit construction is shown with prongs 220 of core holder 230, spaced so as to exert a holding force on the inside passageway 240 of core 200. Again, core 280 is symmetrical throughout its outer surface.

Figure 13:
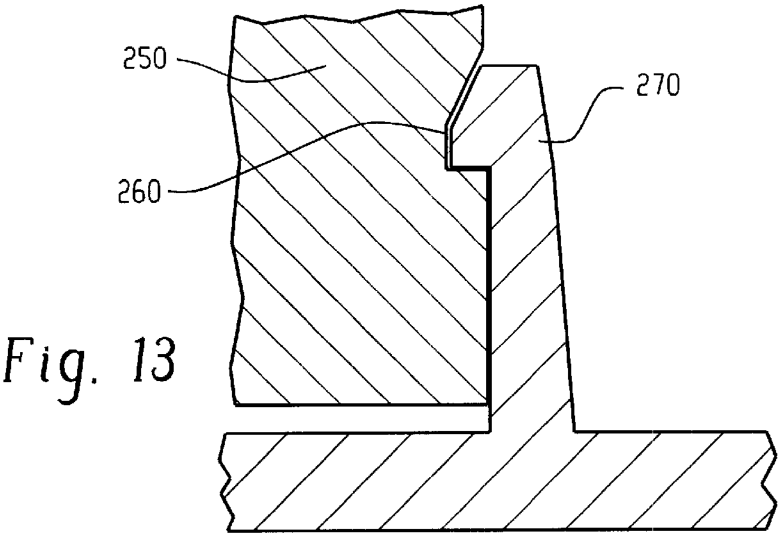

Turning to another embodiment, shown in FIG. 13, is a snap-fit assembly using a grooved ferrite core 250. In this arrangement, in place of the ledge or step portion 40 of core 30, core 250 includes a groove 260. In this embodiment, snap finger 270 is designed to snap into engagement with groove 260 of core 250.

While the invention has been described with respect to specific embodiments by way of illustration, many modifications and changes will occur to those skilled in the art. It is therefore, to be understood that the appended claims are intended to cover all such modifications and changes as fall within the true spirit and scope of the invention.

What is claimed is:

1. A method of assembling a coil comprising:

forming a ferrite core having a top end, a bottom end, an inner opening extending from the top end to the bottom end, a cylindrical outer surface, and a step portion formed near the bottom end, the step portion extending past the outer surface;

applying a first high dielectric material onto the outer surface of the ferrite core, the first high dielectric material being in a partially cured state such that the first high dielectric material has a tacky compliant quality;

winding a conductive wire onto the partially cured first high dielectric material, including embedding at least a portion of the conductive wire into the partially cured first high dielectric material, holding the wound conductive wire in a secure position;

applying a second high dielectric material over the conductive wire; and completing the curing of the first high dielectric material, including forming a hermetic seal around the conductive wire.

2. The method according to claim 1, wherein:

the curing causes the first high dielectric material and the second high dielectric material to form into a single solid mass, wherein the conductive wire is held in a fixed position.

3. The method according to claim 1 further including:

forming a coil holder having, i) a base portion with a base opening formed substantially at a centered area of the coil holder, the base opening being sufficiently sized to provide a passage way to the inner opening of core, and (i) a plurality of snap fit fingers extending from the base portion.

4. The method according to claim 3 further including:

inserting the step portion of the cylindrical ferrite core into the snap fit fingers of the coil holder, wherein the core is locked into engagement with the coil holder.

5. The method according to claim 1 wherein the first high dielectric material is a material different from the second high dielectric material.

6. The method according to claim 1 wherein the steps of applying the first and second high dielectric materials include at least one of coating, spraying, dripping and brushing.

7. A method of assembling a coil comprising:

forming a ferrite core having a top end, a bottom end, an inner opening extending from the top end to the bottom end, a cylindrical outer surface, and a step portion formed near the bottom end, the step portion extending past the outer surface;

applying a first high dielectric material, in a partially cured state having a tacky compliant quality, onto the outer surface of the ferrite core;

winding a conductive wire onto the first high dielectric material, including embedding at least a portion of the conductive wire into the partially cured dielectric material, thereby holding the wound conductive wire in a secure position; and applying a second high dielectric material over the conductive wire.

8. The method according to claim 7 further including:

curing the first high dielectric material and the second high dielectric material into a single solid mass, wherein the conductive wire is held in a fixed position.

9. The method according to claim 8 wherein the step of curing includes forming a hermetic seal around the conductive wire.

10. The method according to claim 7 further including:

forming a coil holder having, i) a base portion with a base opening formed substantially at a centered area of the coil holder, the base opening being sufficiently sized to provide a passage way to the inner opening of the core, and (i) a plurality of snap fit fingers extending from the base portion.

11. The method according to claim 10 further including:

inserting the step portion of the cylindrical ferrite core into the snap fit fingers of the coil holder, whereby the core is locked into engagement with the coil holder.

12. The method according to claim 7 wherein the first high dielectric material is a material different from the second high dielectric material.

13. The method according to claim 7 wherein the steps of applying the first and second high dielectric materials include at least one of coating, spraying, dripping and brushing.

14. A method of assembling a coil which includes a core having a top end, a bottom end, an inner opening extending from the top end to the bottom end, and a cylindrical outer surface, the method comprising:

applying a first high dielectric material onto the outer surface of the core;

winding a conductive wire onto the first high dielectric material;

applying a second high dielectric material over the conductive wire;

curing the first high dielectric material and the second high dielectric material into a single solid mass, wherein the conductive wire is held in a fixed position;

inserting the core into a coil holder, the coil holder including a base portion with a base opening, the base opening being sufficiently sized to provide a passage way to the inner opening of the core.

15. The method according to claim 14 wherein the first high dielectric material is a material different from the second high dielectric material.

16. The method according to claim 15 wherein, the step of applying the first high dielectric material further includes applying the first high dielectric material in a partially cured state such that the first high dielectric material has a tacky compliant quality;

the step of winding the conductive wire onto the partially cured first high dielectric material including embedding at least a portion of the conductive wire into the partially cured high dielectric material, thereby holding the wound conductive wire in a secure position; and the step of curing includes forming a hermetic seal around the conductive wire.

17. The method according to claim 14 wherein the steps of applying the first and second high dielectric materials include at least one of coating, spraying, dripping and brushing.

18. The method according to claim 14 wherein the step of inserting includes inserting a step portion into snap fit fingers of the coil holder.

* * * * *